US006588532B1

(12) United States Patent
Adams et al.

(10) Patent No.: US 6,588,532 B1
(45) Date of Patent: Jul. 8, 2003

(54) RESCUE ASSIST SAFETY SYSTEM

(76) Inventors: Kerry J. Adams, 44A Hornes Road, Eastern Passage, Nova Scotia (CA), B3G 1A5; Richard W. Jones, 44 Hornes Road, Eastern Passage, Nova Scotia (CA), B3G 1A5

(*) Notice: Subject to any disclaimer, the term of this patent is extended or adjusted under 35 U.S.C. 154(b) by 0 days.

(21) Appl. No.: 09/824,816

(22) Filed: Apr. 4, 2001

Related U.S. Application Data

(63) Continuation-in-part of application No. 09/134,128, filed on Aug. 14, 1998, now Pat. No. 6,230,838.

(51) Int. Cl.[7] .............................................. B60R 21/00
(52) U.S. Cl. ....................................................... 180/271
(58) Field of Search ........................................ 180/271

(56) References Cited

U.S. PATENT DOCUMENTS

| | | | |
|---|---|---|---|
| 4,068,221 A | 1/1978 | McClintock | 340/244 |
| 4,337,402 A | 6/1982 | Nowakowski | 307/121 |
| 4,381,829 A | 5/1983 | Montaron | 180/274 |
| 4,714,914 A | 12/1987 | Boe | 340/573 |
| 4,785,907 A | 11/1988 | Aoki et al. | 180/274 |
| 5,327,990 A | 7/1994 | Busquets | 180/271 |
| 5,481,139 A | 1/1996 | Lucas | 307/9.1 |
| 5,547,208 A | 8/1996 | Chappell et al. | 180/281 |
| 5,571,253 A | 11/1996 | Blackburn et al. | 180/282 |
| 5,574,315 A | 11/1996 | Weber | 307/10.1 |
| 5,684,336 A | 11/1997 | McCurdy | 307/10.1 |

FOREIGN PATENT DOCUMENTS

| | | |
|---|---|---|
| CA | 1283724 | 4/1991 |
| FR | 2366030 | 6/1978 |
| FR | 2463028 | 3/1981 |

OTHER PUBLICATIONS

Document Entitled: "Collision Detection and Vehicle Door Lock Control Algorithm" Found in "Digest of Class 180/289".
Abstract of RU 2,057,671.
Abstract of JP 11,210,317.
Abstract of JP 11,286,213.

*Primary Examiner*—Paul N. Dickson
*Assistant Examiner*—Joselynn Y Sliteris
(74) *Attorney, Agent, or Firm*—Mario Theriault

(57) ABSTRACT

The present invention consists of a system for automatically lowering power windows and unlatching power door locks of an automobile after an accident. The system is responsive immediately to a vehicle immersion condition or a vehicle fire condition. The system is responsive after a set delay to a vehicle inversion condition or a vehicle impact. A second timer deactivates the system as soon as the doors are unlocked and the windows are at least partly opened following a vehicle impact. The system is advantageous for preventing the entrapment of people in a damaged vehicle, in four of the worst life-endangering situations, without affecting the retention of these people inside the vehicle during the development of the accidents preceding these situations. A diagnostic circuit is also provided for interrogating some of the hazardous condition sensors for the purpose of periodically verifying the integrity of these sensors.

3 Claims, 2 Drawing Sheets

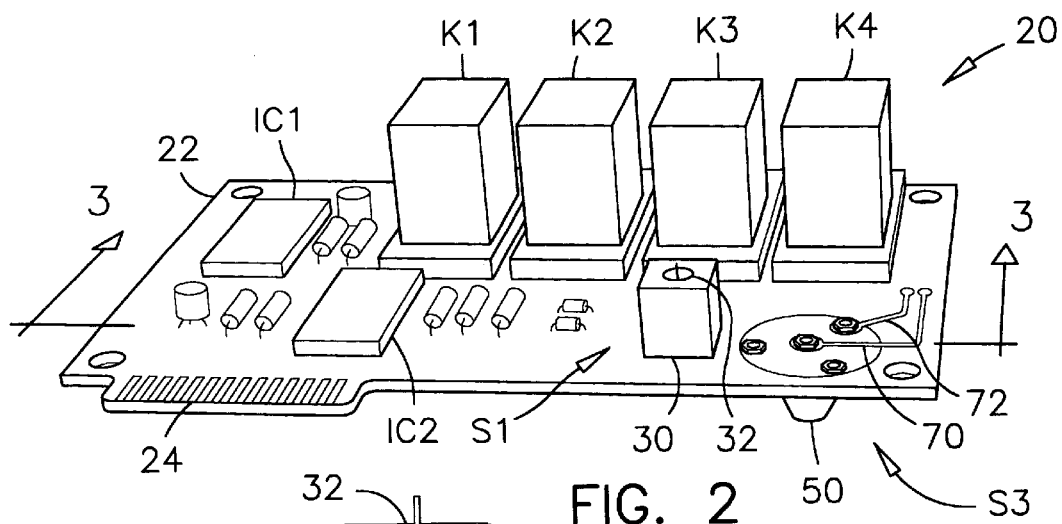
FIG. 2
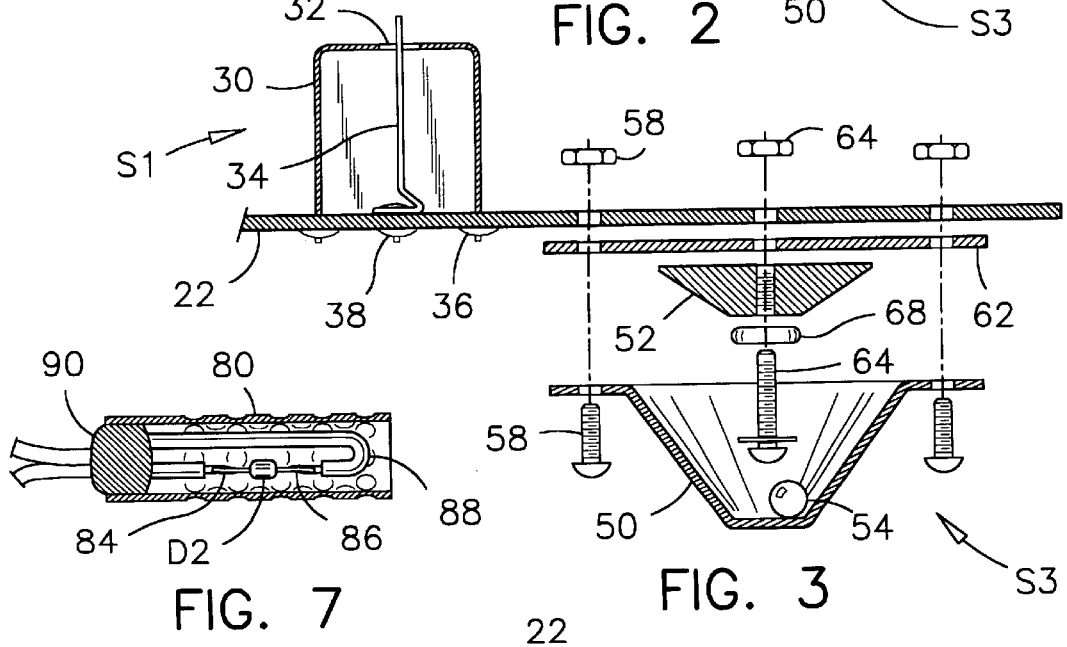
FIG. 7
FIG. 3
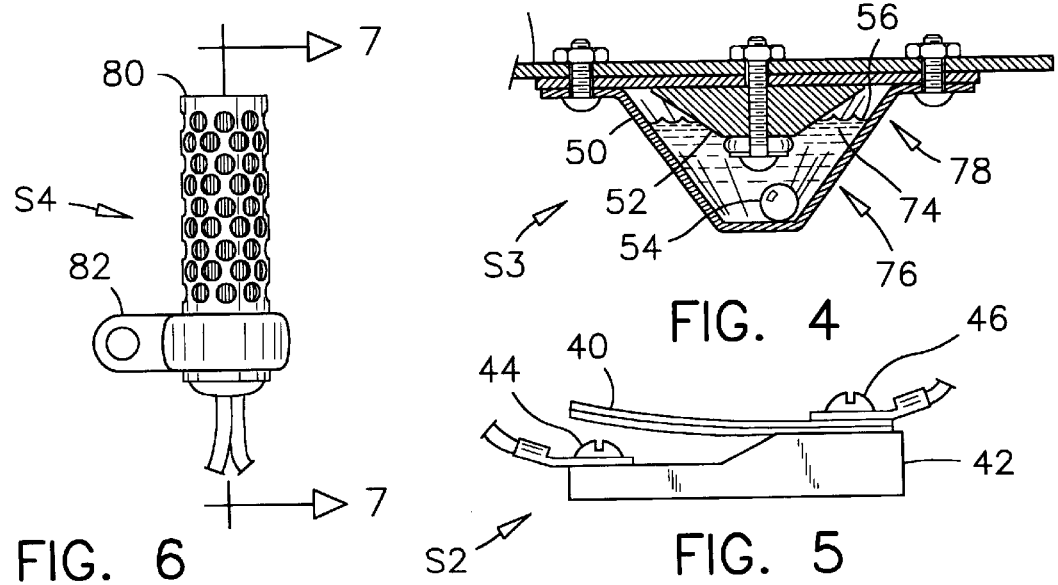
FIG. 6
FIG. 4
FIG. 5

RESCUE ASSIST SAFETY SYSTEM

This is a continuation-in-part of U.S. patent application Ser. No. 09/134,128, filed on Aug. 14, 1998 now U.S. Pat. No. 6,230,838.

FIELD OF THE INVENTION

This invention relates to apparatus for unlatching power door locks and lowering power windows of a motor vehicle in emergency situations. More particularly, the present invention relates to emergency vehicle exit systems having sensor-diagnostic circuits to periodically verify the integrity of the condition sensors thereof.

BACKGROUND OF THE INVENTION

Since about the mid 1980s, an increasing number of motor vehicles have been equipped with power windows and power door locks. Once considered optional accessories, these features are now installed in a majority of all new motor vehicles. Generally, the power window feature is operational only when the key is set in the run position and the accessories are receiving power from the battery. The power door locks are operational, regardless of the ignition key's position, as long as the motor vehicle is receiving power from the battery.

As a result of the installation of power windows and power door locks in most automobiles, two new safety hazards now exist. Firstly, in the event of an accident resulting in the incapacitation of the vehicle's electrical power system, the conscious motor vehicle operator is often unable to open the doors or lower the windows. In many cases, there are structural damages to the door frames or to the door posts which are significant enough to prevent the manual opening of the doors from the inside. In the past, the only remedy for this situation was the breaking of a window from the inside, which was only possible when the proper tool was accessible inside the vehicle.

Secondly, in the event of an accident which results in the physical incapacitation or loss of consciousness of the vehicle operator or a passenger, there could be no able person inside the vehicle to unlock the doors or lower the windows. This represents a serious safety concern for the rescue personnel wanting to access the injured persons. In the past, the only remedy was the manual breaking of a window from the outside or the use of the Jaws of Life™. However, the breaking of a motor vehicle window from the outside is likely to project shattering glass inside the vehicle, which could worsen fresh injuries on the occupants, or further harm the occupants.

These two safety concerns, basically, have created a need for emergency vehicle exit apparatus to automatically take control of the power door locks and power windows of a vehicle in emergency situations.

An apparatus for unlatching power door locks and lowering power windows generally comprises an electronic module and a plurality of condition sensors mounted at various strategic locations on the vehicle body. When these condition sensors and the wiring between the sensors and the electronic module are exposed to the weather, to vibration and to road splashes, deterioration of the sensors and wiring could occur. Therefore, a preferred feature in such emergency vehicle exit system is the provision of a circuit to periodically test the conditions of the sensors and the associated wiring, in order to detect and quickly repair a defective function of the system.

In that respect, it is believed that when an emergency vehicle exit system is equipped with one or more vehicle immersion sensors, these sensors are most vulnerable to deterioration for being continuously exposed to the weather conditions. Therefore another preferred feature of such system is that the immersion sensors must be reliable, durable and suitable for being interrogated by a sensor-diagnostic circuit.

Examples of vehicle exit systems available in the prior art to unlatch power door locks and lower power windows after an accident are described in the following documents:

U.S. Pat. No. 4,381,829 issued on May 3, 1983 to B. Montaron;

U.S. Pat. No. 4,785,907 issued on Nov. 22, 1988 to K Aoki et al.

U.S. Pat. No. 5,327,990 issued on Jul. 12, 1994 to A. B. Busquets;

U.S. Pat. No. 5,547,208 issued on Aug. 20, 1996 to J W Chappell et al.

U.S. Pat. No. 5,574,315 issued on Nov. 12, 1996 to H J Weber;

Although several vehicle emergency exit systems are available in the prior art, it is believed that these prior systems are deficient in at least the features of having immersion sensors that are resistant to the weather conditions and having immersion sensors that are capable of being interrogated by a diagnostic circuit. As such, it is believed that a need still exists for a system in which the conditions sensors are more durable and reliable than the prior art detectors. Furthermore, it is also believed that a need exists for an emergency vehicle exit system which has means to periodically verify the conditions of the sensors that are exposed to rude environment and warn the vehicle operator of these conditions.

SUMMARY OF THE INVENTION

The rescue assist safety system according to the present invention, hereinafter referred to as the RAS system, is designed to provide an immediate and visible escape route out of a damaged vehicle, and to provide easier access to passengers by medical and rescue personnel. The RAS system is designed to be installed in new vehicles at the factory, or to be installed as a retrofit accessory in older vehicles, by licensed auto-mechanics.

In a broad aspect of the present invention, there is provided a system for automatically lowering power windows and unlatching power door locks of a motor vehicle in the event of an accident. The system comprises a circuit having relays for actuating the power door locks and the window lowering motors of the motor vehicle. The RAS system also comprises;

a) a vehicle immersion sensor connected to the circuit and having means to operate the relays immediately upon being exposed to a vehicle immersion condition;

b) a vehicle fire detector connected to the circuit and having means to operate the relays immediately upon being exposed to a vehicle fire condition;

c) a vehicle inversion detection switch connected to the circuit and having means to operate the relays after a set delay from being exposed to a vehicle inversion condition; and d) a combination of a vehicle impact detection switch connected to the circuit, and a timer connected to the circuit and to the vehicle impact detection switch for operating the relays after a fixed delay upon the vehicle impact detection switch being exposed to a vehicle impact condition.

The present invention is advantageous for preventing the entrapment of people in a damaged vehicle, in four of the worst life-endangering situations, without affecting the retention of these people inside the vehicle during the development of the accidents preceding these situations.

In another aspect of the present invention, the RAS system comprises a means for interrogating some of the hazardous condition sensors, for the purpose of periodically verifying the integrity of these sensors. This feature is appreciable for ensuring a proper operation of the sensors that are exposed to rude environmental conditions, outside or under an automobile body for example.

In accordance with another aspect of the present invention, the impact detection switch is made of a hollow metal housing having a hole there though and a spring wire extending through that hole. The metal housing and the spring wire are respectively connected to an input and an output of this impact detection switch. An impact of a predetermined magnitude on the switch deflects the spring wire and momentary closes the switch for activating the RAS system. This novel impact detection switch is manufacturable in a miniature format for mounting directly on a printed circuit board.

In yet another aspect of the present invention, the vehicle inversion detection switch comprises a metal cup connected to a first part of the circuit, a metal cone mounted inside the cup in a spaced-apart relationship with the metal cup, and being connected to a second part of the circuit, and a metal ball movably held inside the metal cup, between the metal cup and the metal cone. The metal cup and the metal cone jointly define a circular hollow segment of revolution having converging surfaces defining a first gap being larger than a diameter of the metal ball and a second gap being smaller than the diameter of the metal ball. When the switch is tilted on its side or inverted upside down, the metal ball moves between the first gap and across the second gap to connect the first and second parts of the circuit. In the preferred configuration, the metal cup contains a viscous insulating fluid for dampening a motion of the metal ball between the first gap and the second gap.

This inversion detection switch is advantageous for having a built-in timer for retarding the operation of the RAS system upon being moved in a tilted or an inverted position. This switch is also advantageous for being manufacturable in a miniature format for mounting directly on a printed circuit board.

In yet a further aspect of the present invention, the immersion sensor comprises a diode mounted in a reversed biased mode and having bare lead wires which can be shorted across when immersed in water. The diode is enclosed in a perforated splash guard to prevent a false short circuit signal when the vehicle is driving through a puddle or in rain. This type of immersion sensor is advantageous for its simplicity, for its low cost of manufacture and especially for its ability to be interrogated by a diagnostic circuit, for the purpose of testing its condition.

Other advantages and novel features of the present invention will become apparent from the following detailed description.

BRIEF DESCRIPTION OF THE DRAWINGS

One embodiment of this invention is illustrated in the accompanying drawings, in which like numerals denote like parts throughout the several views, and in which:

FIG. 2 is a partial perspective illustration of the circuit module comprised in the preferred RAS system;

FIG. 3 is a cross-section view of the circuit module taken along line 3—3 in FIG. 2, showing a cross-section view of the impact detection switch and an exploded cross-section view of the inversion detection switch;

FIG. 4 is a cross-section view of the inversion detection switch in an assembled mode, as seen along line 3—3 in FIG. 2;

FIG. 5 is a side view of the fire detector comprised in the preferred RAS system;

FIG. 6 is a side view of an immersion sensor comprised in the preferred RAS system;

FIG. 7 is a cross-section view of the immersion sensor as seen along line 7—7 in FIG. 6;

DETAILED DESCRIPTION OF THE PREFERRED EMBODIMENT

Figure 1:
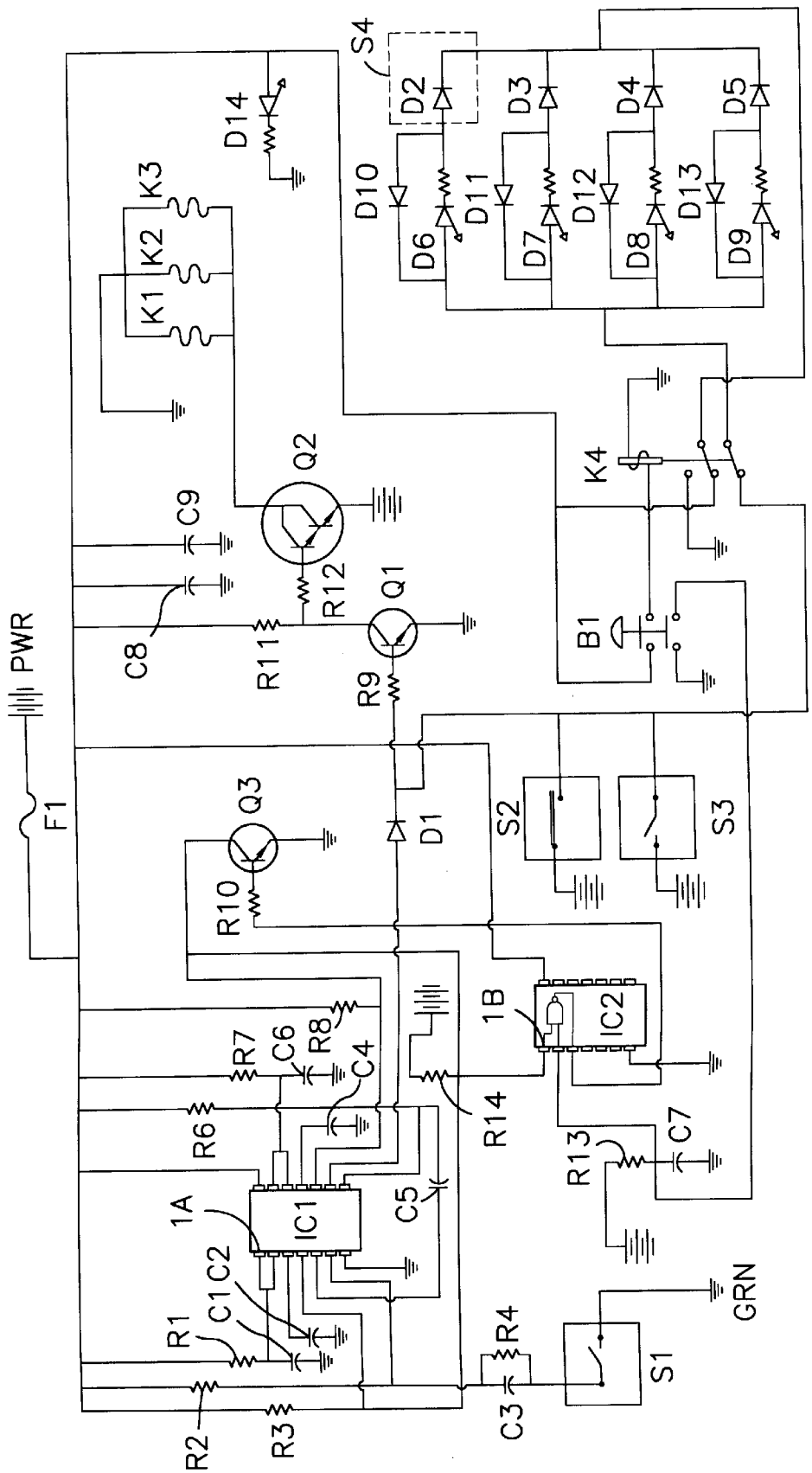
FIG. 1 is a diagram of the circuit for the preferred RAS system.

Reference is firstly made to FIG. 1, illustrating the circuit of the preferred RAS system. In this circuit, IC1 is a model 556 timer chip and IC2 is a MC4011 Quad Dual input NAND Gate chip. In the preferred RAS system there are four types of condition detectors. S1 is an impact detection switch; S2 is a fire detector; S3 is an inversion detection switch, and S4 is an immersion sensor. The structure and operation of these condition detectors will be explained later, particularly when making reference to FIGS. 2–7.

In the preferred circuit, Q1 and Q3 are transistors of the type 2N3904 NPN; Q2 is a transistor of the type ECG 262 PNP Darlington Pair amplifier; C1, C6, C7, C8 are 10 $\mu$f35 WVDC electrolytic capacitors; C2, C4 and C5 are 0.05 $\mu$f ceramic capacitors, and C3 and C9 are 0.01 $\mu$f ceramic capacitors. D1, D2, D3, D4, D5, D10, D11, D12 and D13 are 1N914 diodes. D6, D7, D8, D9 and D14 are light emitting diodes with built-in resistors. R1, R4, R7 and R13 are 1M Ohm, ¼ watt resistors; R2 and R6 are 22 K Ohm, ¼ watt resistors; R3, R8 and R14 are 10 K Ohm, ¼ watt resistors; R9 and R10 are 4.2K Ohm, ¼ watt resistors, and R11 and R12 are 1K Ohm, ¼ watt resistors.

Also comprised in the preferred circuit as illustrated in FIG. 1 are three relays K1, K2 and K3 connected to the power door lock solenoids and to the power window motors of a vehicle. K1, K2 and K3 are 12 volt DC, PC relays (DPDT 5A at 120 volt AC). Because each window or door lock circuit must remain isolated by the RAS system on a single relay, three relays are used. The relay K1 is used to operate the power door lock solenoids; K2 is used to operate the right window lowering motors, and the relay K3 is used to operate the left window lowering motors.

In the preferred circuit, F1 is a 30 ampere fuse. The label PWR or the symbol next to it denotes a 12 volt DC power input, and the label GRN or the accompanying symbol denotes a ground connection. B1 is a double contact push button and K4 is a 12 volt DC, DPDT relay. B1 and K4 are part of the sensor-diagnostic circuit which will be explained in greater details later.

The preferred RAS system is activated in the case of; vehicle impact, fire in one of the engine, trunk or passenger compartment, vehicle inversion or vehicle immersion. The details of operations of the RAS system in each of these four eventualities are described as follows:

Collision

In the case of a vehicle impact, the preferred RAS system sets up two delays; the first delay is to retard the activation of the circuit, and the other delay is to limit the time the circuit is active.

The first delay is activated by a signal from the impact detection switch S1. The switch S1 connects the first trigger input of IC1 (pin 6) to ground. The pins on timer chip IC1 are numbers in a counterclockwise direction from pin 1A. This causes the normally low (0 volt) output of pin 5 to go high (12 volt). This high voltage remains on the output pin 5 until the time constant circuit of capacitor C1 and resistor R1 charges up to approximately ⅔ of the supply voltage. At that time, capacitor C1 is discharged through pin 2 of the timer, forcing pin 5 to go low. This low voltage is felt through capacitor C5 to pin 8, the trigger input of the second stage timer. At the same time, pin 9, the output pin of the second stage timer goes high. This high is passed through the diode D1 and through the resistor R9 to the base of transistor Q1. Transistor Q1 turns on, passing a ground GRN through to the base of transistor Q2. Then, Q2 energizes the three relays K1, K2 and K3 causing the relays to apply 12 volt DC power to the door lock solenoids and to the window lowering motors, energizing them and forcing the doors to unlock and the windows to start to open. This 12 volt DC power remains on until the time constant circuit of the second stage timer, that is the combination of the resistor R7 and capacitor C6, charges up to approximately ⅔ of the supply voltage. At that time the capacitor C6 discharges, forcing pin 9 to go low again, turning Q1 and Q2 off. The three relays K1, K2 and K3 are then switched off to return the door lock solenoids and the window motors to normal operation. In this arrangement, the two delays can be varied according to the preference of a manufacturer, for different models of vehicles for example, by changing the value of the resistors R1 and R7 and of the capacitors C1 and C6 in each of the time constant circuits.

The purpose of the first timer is to ensure that the vehicle has come to a complete stop before lowering the windows and unlatching the door locks. The purpose of the second timer, which causes the de-energizing of the relays K1, K2 and K3 soon after the windows have been lowered and the doors have been unlocked, is to prevent any ignition or explosion of any fuel which could start to leak as a result of an accident.

The purposes of capacitors C2 and C4 are to set up the control voltages for the timer circuits. Comparators inside IC1 detect when the voltages on capacitors C1 or C6 are equal to the voltage charge on capacitors C2 and C4 respectively and force the two time constant capacitors to discharge.

Fire Threat

In case of a fire in the vehicle compartment in which the fire detector S2 is located, the detector S2, when heated, passes 12 volt DC power to the transistor Q1, turning this transistor on. This forces the transistor Q2 to turn on, which again energizes the three relays, K1, K2 and K3, thereby immediately unlocking the doors and causing the windows to open. The window lowering motors are turned on and remain on as long as the vehicle's ignition system is operative and the switch is heated above the threshold temperature.

Vehicle Inversion

The vehicle inversion detection switch S3 has a built-in timer causing a 30 second or so delay in its activation. This built-in timer is to prevent the unlocking of the doors and the opening of the windows while the vehicle might still be tumbling or even slowly rolling over. After 30 seconds or so of inversion, a 12 volt DC power source is connected to the base of transistor Q1, turning it on. This again causes transistor Q2 to turn on, activating the three relays, K1, K2 and K3, thereby causing the doors to unlock and the windows to open.

Vehicle Immersion

In case of a vehicle immersion, any one of the immersion sensors S4 containing one of the diodes D2, D3, D4 and D5 detects an abnormal level of water along a portion of the vehicle. It will be appreciated that a number of immersion sensors S4 can be mounted at various locations on an automobile body to effectively detect the immersion of the vehicle body in water. Each of the diodes D2, D3, D4, D5 or other diodes, is mounted in a reverse biased mode and has both lead wires exposed to the ambient conditions. When the diode is shorted across, upon immersion of the diode in water, a 12 volt DC power is immediately applied to the base of transistor Q1, turning it on. Transistor Q1 causes transistor Q2 to turn on energizing the three relays K1, K2 and K3, causing the doors to unlock and the windows to start to open. The window motors will continue to be activated as long as the vehicle's ignition system is operative and at least one diode is immersed. The windows may only partially open by the time the battery or the electrical system of the vehicle is submerged and shorted out in salt water for example, but this partial opening is nonetheless sufficient to allow the pressure inside the vehicle to equalize with the outside pressure, allowing the victims or a rescuer to open the doors with ease.

Other features of the preferred RAS system include a false triggering prevention sub-system and an immersion sensor diagnostic circuit. These two features are explained as follows:

False Triggering Prevention Sub-System

In a first aspect, false triggering of the circuit is prevented by the capacitors C8 and C9. These two capacitors act as filters, passing any transient voltage spikes to ground. This is to prevent the timer circuits of IC1 from seeing the negative portion of a spike as a trigger input and activating themselves. In a second aspect, the initial energizing of the ignition system of a vehicle causes similar spikes on the vehicle's ignition system which could cause improper activation of the timer circuits of IC1 in a similar manner. To prevent this, resistor R13 and capacitor C7 are incorporated in the preferred RAS system. The time constant provided by this timer circuit keeps one input of the NAND gate (pin2) on the IC2 chip at a low for a nominal period of time when the vehicles ignition is first turned on. The pins on IC2 are numbered in a counterclockwise direction starting from pin 1B. This low on pin 2 causes the output pin 3 of the IC2 chip to be high. This high turns the transistor Q3 on, which places a ground on the reset pins 4 and 10 of the timer chip IC1. This in turn prevents the two timing circuits of IC1 from operating, preventing false triggering of the entire circuit. The holding of the IC1 chip in this state for a short period of time prevents the triggering of the timers in IC1 until the supply voltage has stabilized.

Another feature of the RAS system is that the circuit module is connected to a 12 volt DC power source PWR that is energized only when the vehicle's ignition system is in the run or in the accessory mode position, but not when the starter motor is engaged. This is to prevent the triggering of the system's timers when the starter motor is engaged and the voltage drops considerably. This is also to prevent vehicle theft which could otherwise occur by tampering with one of the external sensors. The light emitting diode D14 is mounted at a convenient location in sight of the driver and provides a visual indication of power on the RAS system.

Immersion Sensor Diagnostic Circuit

The immersion sensors S4 must be mounted high enough inside the car or inside the wheel wells of the vehicle, so that they will not be shorted out by road splashes, rain or light water mist associated with the driving of a vehicle in various weather conditions. Although the immersion sensors are not activated by intermittent contacts with water, these sensors must be mounted in locations where the potential of a vehicle immersion is readily detected. These sensors are therefore subjected to deterioration from being exposed to rude environmental conditions. In the preferred RAS system, a sensor-diagnostic circuit has been provided to periodically verify the integrity of these sensors. Furthermore, the immersion sensors S4 are responsive to interrogation by the diagnostic circuit.

The sensor-diagnostic circuit comprises a push button B1, the relay K4 and the light-emitting diodes D6, D7, D8 and D9, which are individually connected in series with the immersion sensor diodes D2, D3, D4 and D5 respectively. Upon operating the push button Bi, the relay K4 is energized, and applies a voltage in a reverse direction through D2–D5, and D6–D9, lighting up D6–D9 and thereby providing a visual indication as to the continuity of each of the diodes D2–D5 and its associated wiring. The button B1 and the light-emitting diodes can be mounted at any convenient locations on or at the vicinity of the circuit module, such that they are readily accessible to periodically manually test the integrity of the immersion sensors S4. The diodes D10, D11, D12, D13 are used in this circuit as bridges around the light emitting diodes, to allow an emergency immersion signal from one of the immersion sensors S4 to reach the transistor Q1, when the diagnostic circuit is in the normally closed position as illustrated in FIG. 1.

The push button B1 is mounted onto a double contact block wherein one of the contacts is used to apply a ground to the pin 2 on the IC2 chip, thus holding IC1 is a reset condition, while the testing of the immersion sensors is being performed. It will be appreciated that push button B1 can be used to energize other relays (not shown), to operate other light emitting diodes (not shown) for the purpose of similarly testing the integrity of the wiring connected to all the sensors and detectors that are mounted in a vehicle, at a distance from the circuit module and that are subject to deterioration.

Referring now to FIGS. 2–7, the physical characteristics of the RAS system will be described in greater details. Referring firstly to FIG. 2, the circuit module 20 of the preferred RAS system comprises a printed circuit board 22, on which the chips IC1 and IC2 are mounted. The relays K1, K2, and K3 are also preferably mounted directly on the printed circuit board 22. The circuit module 20 is preferably mounted under the dashboard of a vehicle where a connection thereof to the vehicle's wiring system is most easily effected.

Power to the printed circuit board, as well as all other inputs and outputs described herein are connected to the printed circuit board 22 through a connection strip 24 on the edge of the printed circuit board, to which a wiring harness (not shown) is readily mountable.

In the preferred RAS system, the impact detection switch S1 and the inversion detection switch S3 are mounted directly to the printed circuit board 22, as illustrated in FIGS. 2, 3 and 4. The configurations of these switches allow for their miniaturization, such that they take minimum space of the printed circuit board.

The preferred impact detection switch S1 is a mechanical device which is used to detect a sudden change in velocity of a moving object, in any direction, on a single plane. The impact detection switch S1 comprises essentially a hollow metal housing 30 having a hole 32 through its top surface and a signal spring wire 34 extending through the hole 32. The signal wire 34 and the housing 30 are connected to the circuit board onto connections 36, 38, from which one is a 12 volt DC power source and pin 6 on the IC1 chip, and the other is ground.

When there is a change in velocity of the vehicle in which the RAS system is mounted, with sufficient force to overcome the stiffness of the signal spring wire 34, the spring wire displaces in the opposite direction of the change in velocity, and touches the side of the hole 32, thereby closing the switch circuit. The impact detection switch S1 causes a signal to occur in the event of a collision from any direction perpendicular to the spring wire 34.

In summary, the impact detection switch S1 transmits a ground signal to the input of the chip IC1. This ground signal triggers the first stage of a cascaded timer function inside the chip IC1. After a predetermined delay, the circuit passes 12 volt DC from the vehicle's ignition system to the relays K1, K2 and K3, energizing them and causing all door locks to unlatch and all windows to open.

The preferred fire detector S2 is comprised of a bimetallic strip 40 mounted on a base 42, such as illustrated in FIG. 5. When the strip is heated to a certain degree, it bends downward to make a contact between two terminals 44, 46 and applies 12 volt DC power to the transistor Q1 to immediately unlatch the power door locks and lower the power window.

Referring back to FIGS. 3 and 4, the inversion detection switch S3 consists of a conductive metal path between 12 volt DC power to the transistor Q1. This switch is made of a tapering cup 50 in which is mounted a cone-shaped contact disc 52. A metal ball 54 is loosely retained inside the cup 50. In use, the cup 50 is full of insulating oil 56 and is held to the lower side of the printed circuit board 22 by outside fasteners 58. A gasket 62 is provided between the cup 50 and the printed circuit board 22. The cone 52 is also held to the printed circuit board by means of a central fastener 64. An O-ring 68 is preferably provided on the central fastener 64 to prevent any loss of insulating oil along the central fastener 64. The cup 50 and the cone 52 are connected to different potential by means of the outside and central fasteners 58, 64, and their connections to different conductive paths 70 and 72 on the printed circuit board 22.

Referring now particularly to FIG. 4, the cup 50 and the cone 52 have different tapering angles and jointly define a circular hollow segment of revolution 74, which has a first gap 76 and a second gap 78. The first gap 76 is larger than a diameter of the metal ball 54, and the second gap 78 is smaller than the diameter of the metal ball 54. Therefore, when the switch S3 is tilted to its side or inverted upside down, the metal ball moves to establish a contact between the cup 50 and the cone 52. On the other hand, a non-conductive condition exists when the switch lays in the upright position as illustrated. The viscosity of the insulating oil is selected such that a delay of about 30 seconds is obtained before triggering a signal to the transistor Q1 following a vehicle inversion. It will be appreciated that the printed circuit board 22 must be mounted in a level position or near a level position to ensure an optimum operation of the inversion detection switch S3.

As mentioned before, each of the preferred immersion sensors S4 consists of one of the diodes D2, D3, D4 or D5 mounted in a reverse biased mode and encased in a splash-proof casing 80, as illustrated in FIGS. 6 and 7. Each immersion sensor S4 is mounted in the engine compartment, behind the bumpers, or under the wheel wells of a motor vehicle, by means of a collet clip 82 or otherwise. Each sensor is mounted high enough so that it cannot be immersed by driving through a puddle or through rain water. When the sensor is immersed in fresh water or salt water, it is shorted out, allowing a 12 volt signal to appear on the transistor Q1 and causing the RAS system to energize the relays K1 to K3, immediately unlatching the door locks and opening the vehicle's windows. The splash-proof casing 80 is a perforated casing enclosing a diode, D2 for example. The lead wires 84, 86, to the diode D2 are bare over a short distance such that the diode can be shorted across when immersed in water. The diode D2 is held fixed inside the perforated casing 80 by stiff insulated wires 88 that are held in a plug 90 which is preferably made of a resinous material and molded inside the base of the perforated casing 80.

As to other sensors, other detectors, and other manner of usage and operation of the present invention, the same should be apparent from the above description and accompanying drawings, and accordingly, further discussion relative to these aspects of the invention would considered repetitious and is not provided.

While one embodiment of the present invention has been illustrated in the accompanying drawings and described herein above, it will be appreciated by those skilled in the art that various modifications, alternate constructions and equivalents may be employed without departing from the spirit and scope of the invention. Therefore, the above description and the illustrations should not be construed as limiting the scope of the invention which is defined by the appended claims.

We claim:

1. A system for automatically lowering power windows and unlatching power door locks of a motor vehicle in the event of an accident, comprising:

a circuit having relays for actuating power door locks and window lowering motors of a motor vehicle;

an immersion sensor connected to said circuit and having means to operate said relays immediately upon being exposed to a vehicle immersion condition;

a fire detector connected to said circuit and having means to operate said relays immediately upon being exposed to a vehicle fire condition;

an inversion detection switch connected to said circuit and having means to operate said relays after a first delay from being exposed to a vehicle inversion condition; said means to operate said relays after a first delay from being exposed to a vehicle inversion condition comprising a metal ball moving in a viscous fluid between terminals of said vehicle inversion detection switch, and a combination of an impact detection switch connected to said circuit, and timer means connected to said circuit and to said impact detection switch for operating said relays after a second delay upon said impact detection switch being exposed to a vehicle impact condition.

2. The system as claimed in claim 1, wherein said timer means comprises means for de-energizing said relays after a third delay upon said impact detection switch being exposed to a vehicle impact condition.

3. The system as claimed in claim 2, wherein said timer means comprises resistor and capacitor pairs.

* * * * *